(12) United States Patent
Huang et al.

(10) Patent No.: US 8,213,936 B2
(45) Date of Patent: Jul. 3, 2012

(54) SYSTEM AND METHOD FOR EXECUTING A SEAMLESS HANDOFF IN A NETWORK ENVIRONMENT

(75) Inventors: Wenfeng Huang, San Ramon, CA (US); Michael Chang-Ping Chen, San Jose, CA (US); Huizhao Wang, San Jose, CA (US); Xiaode Xu, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 355 days.

(21) Appl. No.: 11/291,029

(22) Filed: Nov. 29, 2005

(65) Prior Publication Data

US 2007/0123259 A1    May 31, 2007

(51) Int. Cl.
*H04W 36/00* (2009.01)
*H04W 40/00* (2009.01)
(52) U.S. Cl. ........................ 455/436; 455/448
(58) Field of Classification Search .................. 455/433, 455/436–444, 448, 415, 416, 417, 450, 452.2, 455/552.1; 370/352, 331, 328
See application file for complete search history.

(56) References Cited

U.S. PATENT DOCUMENTS

| | | | |
|---|---|---|---|
| 5,577,029 A | 11/1996 | Lu et al. | 370/54 |
| 5,887,256 A | 3/1999 | Lu et al. | 455/426 |
| 5,943,332 A | 8/1999 | Liu et al. | 370/342 |
| 6,002,679 A | 12/1999 | Liu et al. | 370/335 |
| 6,016,318 A | 1/2000 | Tomoike | 370/401 |
| 6,141,545 A | 10/2000 | Begeja et al. | 455/417 |
| 6,181,928 B1 | 1/2001 | Moon | 455/415 |
| 6,405,040 B1 | 6/2002 | Liu et al. | 455/435 |
| 6,411,632 B2 | 6/2002 | Lindgren et al. | 370/466 |
| 6,539,237 B1 | 3/2003 | Sayers et al. | 455/555 |
| 6,546,425 B1 | 4/2003 | Hanson et al. | 709/227 |
| 6,611,689 B1 | 8/2003 | Cartigny et al. | 455/461 |
| 6,647,426 B2 | 11/2003 | Mohammed | 709/238 |
| 6,687,360 B2 | 2/2004 | Kung et al. | 379/211.02 |
| 6,748,054 B1 | 6/2004 | Gross et al. | 379/88.12 |
| 6,771,953 B1 | 8/2004 | Chow et al. | 455/417 |
| 6,807,431 B2 | 10/2004 | Sayers et al. | 455/555 |
| 6,826,173 B1 | 11/2004 | Kung et al. | 370/352 |
| 6,888,808 B2 | 5/2005 | Jagadeesan et al. | 370/328 |
| 6,961,559 B1 | 11/2005 | Chow et al. | 455/414.1 |
| 2001/0046214 A1 | 11/2001 | Kang | 370/328 |
| 2002/0085517 A1* | 7/2002 | Lee et al. | 370/331 |

(Continued)

OTHER PUBLICATIONS

Garcia-Martin et al; RFC 3455-private-Header (P-Header) Extensions to the SIP for the 3GPP; Feb. 15, 2005; p. 5.*

(Continued)

*Primary Examiner* — Michael Faragalla
(74) *Attorney, Agent, or Firm* — Baker Botts L.L.P.

(57) ABSTRACT

A method for providing a handoff in a network environment is provided that includes a mobile station operable to conduct a call. The mobile station is further operable to initiate a call leg autonomously such that a generic transfer function is invoked. The mobile station leverages the generic transfer function in order to execute a handoff for the mobile station.

16 Claims, 3 Drawing Sheets

U.S. PATENT DOCUMENTS

| | | | | |
|---|---|---|---|---|
| 2002/0111156 | A1* | 8/2002 | Roeder | 455/417 |
| 2003/0040331 | A1* | 2/2003 | Zhao | 455/552 |
| 2003/0134638 | A1 | 7/2003 | Sundar et al. | 455/435 |
| 2003/0134650 | A1 | 7/2003 | Sundar et al. | 455/465 |
| 2003/0224795 | A1 | 12/2003 | Wilhoite et al. | 455/445 |
| 2004/0037324 | A1 | 2/2004 | Heubel et al. | 370/493 |
| 2004/0087307 | A1 | 5/2004 | Ibe et al. | 455/436 |
| 2004/0127208 | A1 | 7/2004 | Nair et al. | 455/420 |
| 2004/0146021 | A1 | 7/2004 | Fors et al. | 370/331 |
| 2004/0266426 | A1 | 12/2004 | Marsh et al. | 455/426.2 |
| 2006/0019659 | A1* | 1/2006 | Rosenberg et al. | 455/432.1 |
| 2006/0077957 | A1* | 4/2006 | Reddy et al. | 370/352 |
| 2006/0270447 | A1* | 11/2006 | Everson et al. | 455/552.1 |

OTHER PUBLICATIONS

J. Rosenberg, "A Session Initiation Protocol (SIP) Event Package for Registrations," Network Working Group, RFC 3680, 22 pgs., Mar. 2004.

M. Garcia-Martin, E. Henrikson, and D. Mills, "Private Header (P-Header) Extensions to the Session Initiation Protocol (SIP) for the 3rd-Generation Partnership Project (3GPP)," Network Working Group, RFC 3455, 29 pgs., Jan. 2003.

Global System for Mobile Communications, "3rd Generation Partnership Project; Technical Specification Group Services and System Aspects; Report on alternative architectures for combining CS Bearers with IMS; Release 6," http://www.3gpp.org, 28 pgs., 2004.

* cited by examiner

SYSTEM AND METHOD FOR EXECUTING A SEAMLESS HANDOFF IN A NETWORK ENVIRONMENT

TECHNICAL FIELD OF THE INVENTION

The present invention relates generally to network communications and, more particularly, to a system and a method for executing a seamless handoff in a network environment.

BACKGROUND OF THE INVENTION

Networking architectures have grown increasingly complex in communications environments. In recent years, a series of protocols and architectures have been developed in order to accommodate a diverse group of end users having various needs. Some of these protocols relate to issues associated with handoffs.

As both public and private network systems grow in size and in sophistication, proper routing and efficient management of communication sessions and data flows becomes even more critical. Advances in technology have resulted in the deployment of various types of wireless networks. However, while most of these wireless networks often provide service to adjacent and/or overlapping physical spaces, most cellular and enterprise network protocols are susceptible to dropped calls.

Accordingly, the ability to provide an effective mechanism to properly process and direct communications for an end user of a mobile device offers a significant challenge to network operators, component manufacturers, and system designers.

SUMMARY OF THE INVENTION

In accordance with some of the teachings of the present invention, techniques for providing an effective handoff between circuit-switched cellular and packet-switched wireless networks are provided. According to some embodiments, these techniques can leverage a transfer function to enable a mobile station to maintain a communication session that is switched between circuit-switched cellular and packet-switched wireless networks. In particular, these techniques can enable a mobile station, alone or in combination with a mobility application, to coordinate multiple calls (or call legs) to achieve optimal connectivity during a communication session.

According to a particular embodiment, a method for providing a handoff is provided that includes a mobile station operable to conduct a call. The mobile station is further operable to initiate a call leg autonomously such that a generic transfer function is invoked. The mobile station leverages the generic transfer function in order to execute a handoff for the mobile station.

In more particular embodiments, the function is invoked after the mobile station has roamed from an enterprise network to a cellular network. In still other more specific embodiments, the function is invoked after the mobile station has roamed from a cellular network to an enterprise network. Additionally, the generic transfer function is a selected one of a blind call transfer (BCT) function and an explicated call transfer (ECT) function.

Embodiments of the invention provide various technical advantages. For example, the architecture of the present invention provides improved connectivity for the end user, who may freely roam between networks. This is a result of the configuration of the present invention, which can readily utilize a simple transfer function to achieve a handover operation.

Another advantage of the present invention is its simplicity. The architecture of the present invention can execute a handover across different networks without additional interworking handover hardware or software. The present invention can leverage features inherent in the mobile device to achieve an optimal handoff, as outlined herein.

Yet another advantage of the present invention is that its deployment can be done without special relationships or deals between a public service provider and other phone service providers. This would allow for a simplification of billing for the providers and, further, offer a considerable cost savings for those involved in such communications.

Certain technical advantages of the present invention may be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
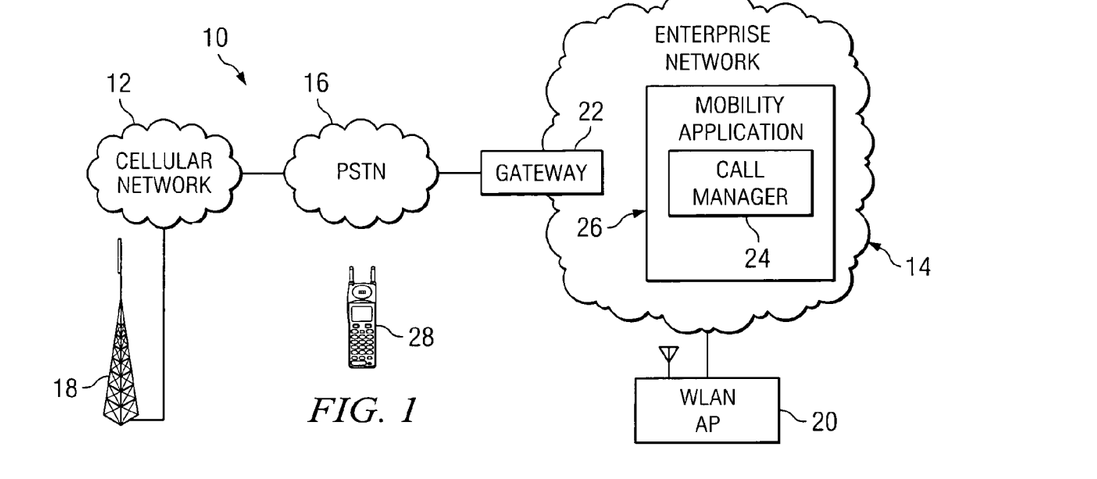
FIG. 1 is a simplified block diagram that illustrates a communication system having elements that support a handoff between cellular and enterprise networks.

FIG. 1 is a simplified block diagram that illustrates a communication system 10 for providing a handoff in a network environment. Communication system 10 comprises a cellular network 12 and an enterprise network 14, which are interconnected through a public switched telephone network (PSTN) 16. One or more base stations 18 are coupled to cellular network 12, and one or more access points 20 are coupled to enterprise network 14. Enterprise network 14 includes a gateway 22, a Call Manager 24 (that is manufactured by Cisco Systems, Inc. of San Jose, Calif.), and a mobility application 26, which can perform one or more operations associated with a handoff server.

Communication system 10 also includes mobile station 28, which may communicate with a remote device through cellular network 12 using base station 18 and/or through enterprise network 14 using a wireless local area network access point (WLAN AP) 20. The elements of communication system 10 can operate to permit mobile station 28 to maintain a communication session that is handed between cellular network 12 and enterprise network 14. According to particular embodiments, mobile station 28 can utilize one or more of various private branch exchange (PBX) functions (e.g. a transfer function) to effect a handoff between cellular network 12 and enterprise network 14.

Prior to discussing the following FIGURES, the problems or situations that are being addressed by the proposed operations should be understood. Consider a scenario in which an end user initiates a call on mobile station 28. In such an example, the end user roams from his enterprise network 14 to cellular network 12, which has to pick up the call.

Conventionally, a call associated with mobile station 28 is properly anchored by mobility application 26. In order to execute a handoff, a new cellular call must be made. Hence, mobile station 28 can make the cellular call (over cellular network 12) to mobility application 26, whereby a switch occurs over to that new call leg. Mobility application 26 is handling multiple calls and multiple mobile stations.

When a call is placed, the call lands on mobility application 26, which recognizes, and is aware of, the call. Hence, when mobile station 28 moves to cellular network 12, mobility application 26 receives a stealth call from mobile station 28 and, in response to the stealth call, mobility application 26 collaborates with Call Manager 24 to switch (or to transfer [on the fly]) the call. In a similar, reciprocal fashion, when mobile station 28 moves back to enterprise network 14, it communicates with mobility application 26, which transfers the call from a cellular call leg to a voice over IP (VoIP) call leg.

Hence, it can be appreciated that, as a general networking proposition, a wireless telephone has incredible value because it is portable, as it can readily traverse multiple networks without losing connectivity. Current wireless phone handovers (between different networks) require extensive work in adding an additional network handover control unit.

Aside from technical complexity issues and additional costs to make a multimode phone functional, the operational model in such a scenario typically involves a roaming agreement between a public service provider and an enterprise network. This can present a problem because, generally, fee-based cellular service providers do not want to divert their revenue by handing off calls made on their own networks. In a similar vein, corporations have no intent on paying for calls initiated on its own premises. As outlined in the scenarios described above, conventionally, a handover is enabled between networks by adding an inter-networking function (e.g. hardware and/or software), whereby handover intelligence is built on the network side.

Communication system 10 proposes a new solution in which existing features of the public wireless phone network and the office phone system (e.g. VoIP) are leveraged to execute a handoff. Such a protocol involves minimal work for the handset and, potentially, no modifications on the mobility application side of the architecture. This arrangement allows the mobile phone to achieve handovers between different networks more easily and in a seamless fashion. Additional details related to these operations are provided below with reference to FIGS. 2, 3A, and 3B. Before turning to those discussions, the components of FIG. 1 are detailed extensively below.

Cellular network 12 represents communications equipment, including hardware and any appropriate controlling logic, for providing wireless telephony services using cellular protocols and technology. Various cellular protocols and technologies may be used by cellular network 12, including but not limited to global system for mobile communications (GSM), time division multiple access (TDMA), code division multiple access (CDMA), and any other appropriate analog or digital cellular protocol or technology. Furthermore, cellular network 12 may utilize signaling system 7 (SS7) protocol for signaling purposes. Cellular network 12 may include any number of base stations 18, as well as base station controllers, mobile switching centers, and other appropriate communications equipment for use in communicating with mobile station 28 and PSTN 16. Thus, as illustrated, cellular network 12 may couple to base station 18 to receive and transmit wireless signals to and from mobile station 28.

Enterprise network 14 represents communications equipment, including hardware and any appropriate controlling logic, for interconnecting elements coupled to enterprise network 14. Thus, enterprise network 14 may represent a local area network (LAN), a wide area network (WAN), and/or any other appropriate form of network. Furthermore, elements within enterprise network 14 may utilize circuit-switched and/or packet-based communication protocols to provide for wireline telephony services. For example, elements within enterprise network 14 may utilize Internet Protocol (IP). In addition, elements within enterprise network 14 may utilize wireless standards such as the 802.11 family of wireless standards to provide for wireless telephony services. Note that the 802.11 family of wireless standards includes, among others, 802.11a, 802.11b, and 802.11g. Enterprise network 14 may also utilize interactive voice response (IVR). Enterprise network 14 may include any number of wireless network devices 20, gateways 22, Call Managers 24, and other appropriate communications equipment for use in communicating with mobile station 28 and PSTN 16. In the embodiment illustrated, enterprise network 14 includes access point 20, gateway 22, Call Manager 24, and mobility application 26. Access point 20 represents communications equipment, including hardware and any appropriate controlling logic, for providing wireless access to enterprise network 14. Access point 20 may utilize one or more of the 802.11 standards. However, any appropriate wireless standard or protocol may be used.

Gateway 22 represents communications equipment, including hardware and any appropriate controlling logic, for interconnecting enterprise network 14 with cellular network 12 and/or PSTN 16. Gateway 22 may be used to convert communications between different communication protocols. For example, gateway 22 may convert communications received from cellular network 12 in SS7 protocol to any of various other protocols that may be used by enterprise network 14, such as protocols associated with the an integrated services digital network (ISDN) standard in the case of circuit-switched trunking and H.323, session initiation protocol (SIP), or other appropriate protocols in the case of IP-based trunking.

Call Manager 24 represents communications equipment or a communications platform, including hardware and any appropriate controlling logic, for providing telephony services over enterprise network 14. For example, Call Manager 24 may support VoIP communications, using any of various protocols such as SIP, signaling connection control point (SCCP) protocol, media gateway control protocol (MGCP), H.323, and/or any other appropriate protocol for VoIP. Furthermore, Call Manager 24 may act as an IP PBX and support PBX functions, such as hold, park, transfer, redirect, and/or other high level and low level call management features.

Mobility application 26 represents a server in one embodiment of the present invention, but alternatively could be replaced with any other appropriate device (e.g. a router, switch, bridge, gateway, etc.) that facilitates the operations detailed herein. Mobility application 26 includes any suitable collection of hardware, software, and controlling logic to support a handoff between cellular network 12 and enterprise network 14, as outlined herein in this document. For example, mobility application 26 may, when appropriate, utilize PBX features to effect a handoff of a communication session between cellular network 12 and enterprise network 14.

It should also be noted that the internal structure of mobility application 26 and mobile station 28 are malleable and can readily be changed, modified, rearranged, or reconfigured in order to achieve their intended operations as they pertain to the handoff function and/or the generic transfer function. As used herein in this document, the term "generic transfer function" is inclusive of the blind call transfer (BCT) function and the explicated call transfer (ECT) function, as well as any other mobile device feature that is operable to execute any such operation. For example, a simple conference operation (e.g. a 3-way conference) is included within such broad terminology. Software and/or hardware may reside in these elements (or in just one) in order to achieve the teachings of the present invention. Hence, software and/or hardware is provided in mobile station 28, which knows how to autonomously invoke cellular features (e.g. conferencing, transfer, redirect, three-way calling, barging operations, HOLD, resume, call-waiting, caller ID, etc.) to achieve an effective handoff.

However, due to their flexibility, these elements (mobility application 26 and mobile station 28) may alternatively be equipped with (or include) any suitable component, device, application specific integrated circuit (ASIC), processor, microprocessor, algorithm, read-only memory (ROM) element, random access memory (RAM) element, erasable programmable ROM (EPROM), electrically erasable programmable ROM (EEPROM), field-programmable gate array (FPGA), or any other suitable element or object that is operable to facilitate the operations thereof. Considerable flexibility is provided by the structures of mobility application 26 and mobile station 28 in the context of communication system 10 and, accordingly, they should be construed as such.

PSTN 16 represents communications equipment, including hardware and any appropriate controlling logic, through which cellular network 12 and enterprise network 14 may communicate. PSTN 16 may include switches, wireline and wireless communication devices, and any other appropriate equipment for interconnecting cellular network 12 and enterprise network 14. PSTN 16 may include portions of public and private networks providing network transport services between various geographic areas and networks.

Mobile station 28 represents a mobile device, including hardware and any appropriate controlling logic, capable of communicating with devices through cellular network 12 and enterprise network 14 and maintaining communication sessions with remote devices during handoff between cellular network 12 and enterprise network 14. Mobile station 28 may communicate through cellular network 12 using base station 18 and through enterprise network 14 using access point 20. Furthermore, mobile station 28 may interact with Call Manager 24 and/or mobility application 26 when appropriate to utilize PBX features to effect a handoff between cellular network 12 and enterprise network 14.

In operation, mobile station 28 may initiate and receive telephone calls through cellular network 12 and/or enterprise network 14 to establish communication sessions with remote devices. Note that, as used herein, a remote device refers to any communications device capable of establishing communications sessions with mobile station 28, such as devices located in cellular network 12, enterprise network 14, PSTN 16, or other linked networks. Furthermore, as used herein, a communication session refers to the transfer of voice, video, data, and/or other information between two or more communication devices. For example, according to particular embodiments a communication session may involve a call between two communication devices or a conference call involving two or more communication devices.

At any point in time, mobile station 28 may determine to handoff a communication session from cellular network 12 to enterprise network 14 or from enterprise network 14 to cellular network 12. For example, after establishing a communication session, mobile station 28 may lose or begin to lose connectivity with base station 18 or WLAN access point 20. Signal degradation may occur due to various causes. For example, mobile station 28 may begin to lose wireless connectivity due to physical movement. When possible, mobile station 28 may switch between using base station 18 and WLAN access point 20 for communications. Moreover, in certain circumstances mobile station 28 may maintain a communication session during handoff between cellular network 12 and enterprise network 14.

Handoff may occur when mobile station 28 travels from an area serviced by cellular network 12 to an area serviced by enterprise network 14. Handoff may also occur in the opposite direction, when mobile station 28 travels from an area serviced by enterprise network 14 to an area serviced by cellular network 12. However, handoff may occur at any other appropriate time. For example, handoff may occur when mobile station 28 is located in an area serviced by both network types due to a predetermined preference of one type of network, due to a spontaneous choice of a user of mobile station 28, or in response to analyzing error rates or other data associated with signaling provided by one or both types of networks. For example, error rates may be associated with signal strengths of base station 18 and access point 20, and may be dependent upon a location of mobile station 28.

The actual handoff may be invoked by mobile station 28, which is capable of leveraging a transfer function or a conferencing function to achieve this operation. Details relating to these operations (in both directions) are provided below with reference to FIGS. 3A and 3B.

It should be noted that communication system 10 represents only one embodiment of a system that supports handoff between cellular and enterprise wireless networks. Various alternative embodiments are possible. For example, while in the illustrated embodiment enterprise network 14 couples to cellular network 12 through PSTN 16 using gateway 22, various other embodiments may include enterprise network 14 coupling to cellular network 12 in other ways. For example, enterprise network 14 may couple to cellular network 12 using a service provider that supports VoIP. Thus, in alternative embodiments, cellular network 12 and gateway 22 may not be included in communication system 10.

Figure 2:
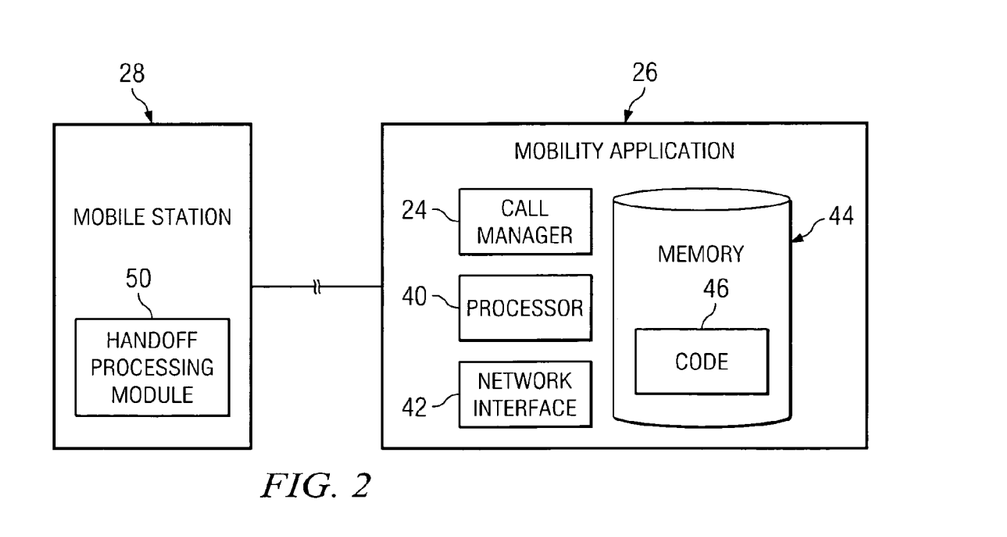
FIG. 2 is a block diagram illustrating functional components of a mobility application and a mobile station from the communication system.

FIG. 2 is a block diagram illustrating functional components of mobility application 26 and mobile station 28. In the embodiment illustrated, mobility application 26 includes Call Manager 24, as well as a processor 40, a network interface 42, and a memory 44. Mobile station 28 includes a handoff processing module 50 in this particular embodiment. These functional elements can operate to support a handoff of active communication sessions when mobile station 28 roams between cellular network 12 and enterprise network 14. These elements can also facilitate the feature support operations as outlined herein in this document.

Handoff processing module 50 knows how to invoke a mobile device feature autonomously such that a handoff can be achieved. This ability is present when mobile station 28 is on cellular network 12 or in enterprise network 14. Mobile station 28 also performs general feature invocation when it is on enterprise network 14.

Processor 40 controls the operation and administration of elements within mobility application 26. For example, processor 40 operates to process information received from network interface 42 and memory 44. Processor 40 includes any hardware and/or logic elements operable to control and process information. For example, processor 40 may be a programmable logic device, a microcontroller, a microprocessor, and/or any other suitable processing device.

Network interface 42 communicates information to and receives information from devices coupled to enterprise network 14. For example, network interface 42 may communicate with gateway 22, Call Manager 24, and access point 20. Furthermore, network interface 42 may receive information from and transmit information to remote devices as well as mobile station 28. Thus, network interface 42 includes any suitable hardware or controlling logic used to communicate information to or from elements coupled to mobility application 26.

Memory 44 stores, either permanently or temporarily, data and other information for processing by processor 40 and communication using network interface 42. Memory 44 includes any one or a combination of volatile or nonvolatile local or remote devices suitable for storing information. For example, memory 44 may include random access memory (RAM), read only memory (ROM), magnetic storage devices, optical storage devices, or any other suitable information storage device or a combination of these devices. As illustrated, memory 44 may include one or more memory modules, such as code 46.

Code 46 includes software, executable files, and/or appropriate logic modules capable when executed to control the operation of mobility application 26. For example, code 46 may include executable files capable of supporting handoff between cellular network 12 and enterprise network 14. Code 46 may include instructions to enable mobility application 26 to utilize PBX features. In addition, code 46 could also be provided in order to offer both (or multiple) calls to mobile station 28, as outlined herein.

In operation, network interface 42 may receive an indication from mobile station 28 that mobile station 28 intends to utilize a second network, for example cellular network 12. In some embodiments, processor 40 may communicate a handoff number to mobile station 28 through network interface 42. Note that mobility application 26 may use any appropriate protocol to communicate with other elements of communication system 10. For example, mobility application 26 may utilize Java telephony application programming interface (JTAPI) to interact with Call Manager 24.

While this example includes specific functional components for mobility application 26 and mobile station 28, these elements may include any collection and arrangement of components, including some or all of the enumerated functional components, for supporting feature invocation. Moreover, mobility application 26 contemplates implementing each of the functional components using any suitable combination and arrangement of hardware and/or logic, and implementing any of the functionalities using a computer program stored on a computer-readable medium. Furthermore, mobility application 26 may be implemented as a stand-alone device, or aspects of mobility application 26 may be distributed among various devices within enterprise network 14. Alternatively, in some embodiments mobility application 26 may be incorporated into Call Manager 24.

Figure 3A:
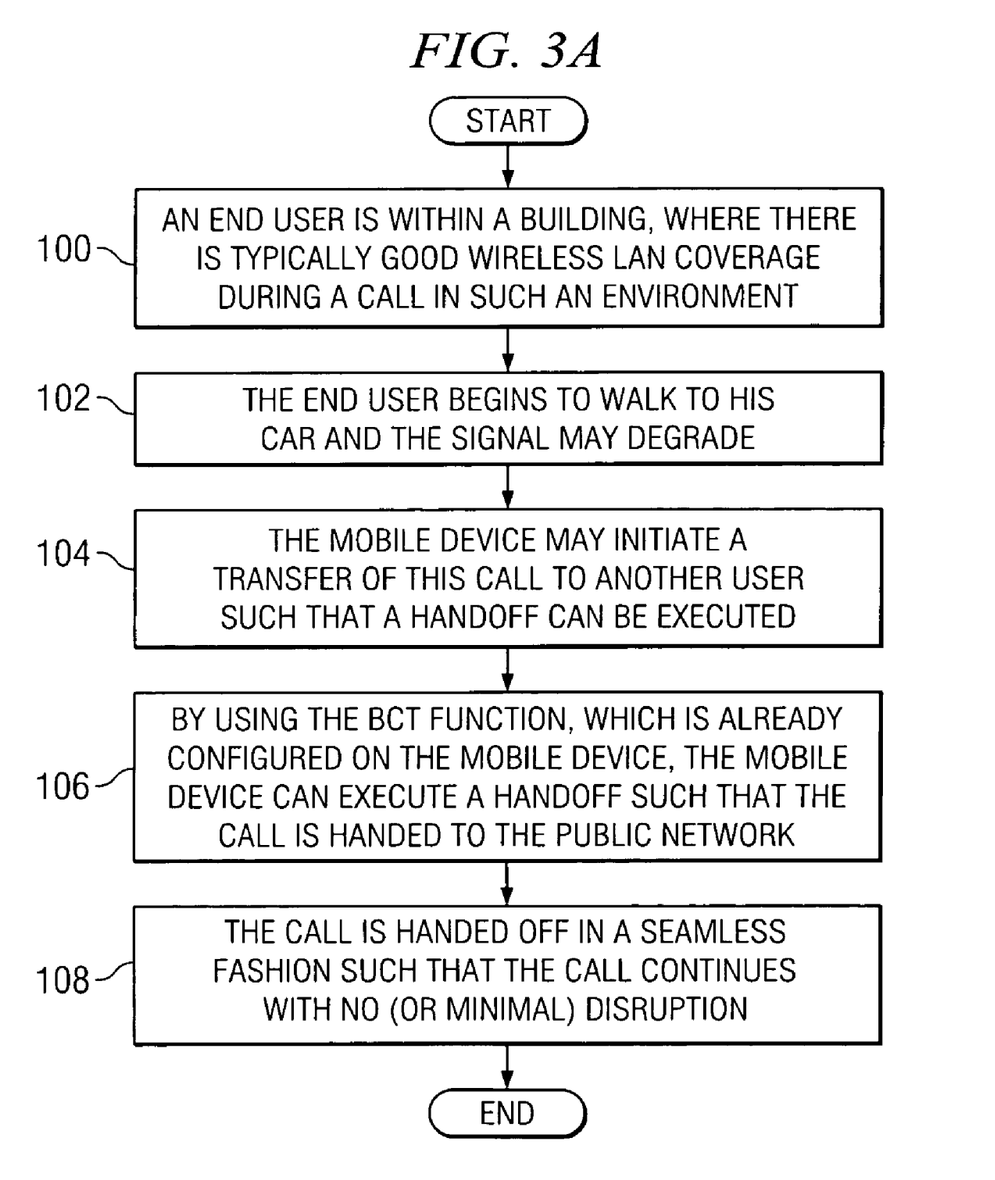
FIGS. 3A and 3B are simplified flowcharts associated with methods for providing an effective handoff in the communication system.
Figure 3B:
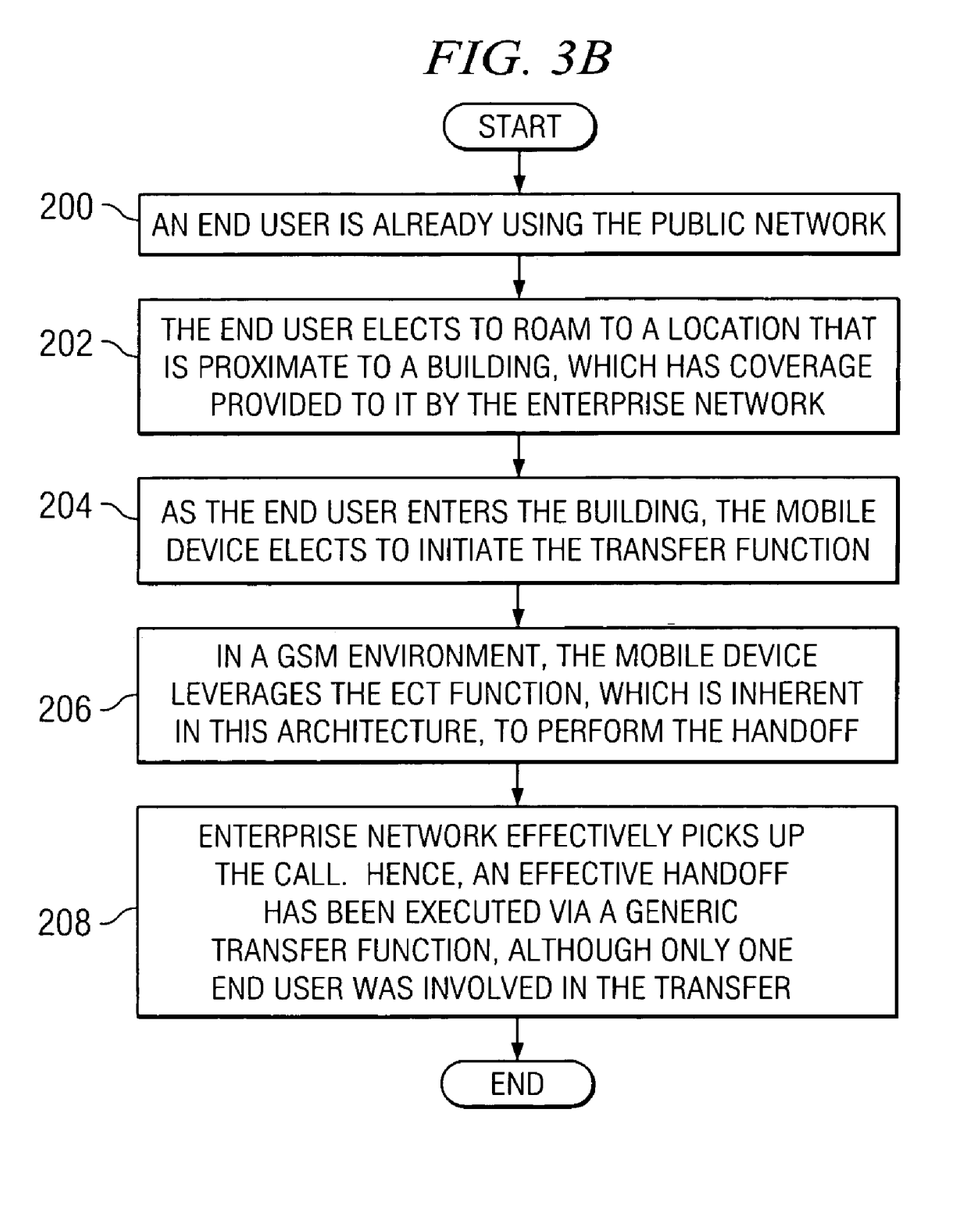

Turning now to FIGS. 3A and 3B, FIGS. 3A and 3B are simplified flowcharts associated with a method for providing a seamless handoff in communication system 10. FIG. 3A illustrates an in-to-out protocol (i.e. from an enterprise network to a public network), while FIG. 3B provides an out-to-in protocol, as outlined below. Communication system 10 can leverage existing features of PLMN, VoIP, and other systems to accomplish a seamless handover function among different networks. Concisely stated, mobile station 28 can recognize that a transferred call is an inter-network roaming call and, therefore, answer the call automatically without the attention of user.

Note that there are typically two major components in the effort for the handover: 1) multimode radios work simultaneously to maintain radio links such that radio frame exchanges (as between mobile station 28 and a network (e.g. the GSM network and the WLAN network)) will not be lost; and 2) continuous monitoring of the quality of both networks. An appropriate handoff is performed when it is determined that one radio link is inferior to the other link (with a sufficient margin over a period of time).

Features such as call transfer and conference call (modified) can be used to serve as the platform for the handover. Mobile station 28 can initiate an automatic handover based signal quality and, subsequently, connect a transferred or a conference call. Mobile station 28 can also drop the unused call leg. These operations are further detailed below with reference to FIGS. 3A and 3B.

In operation of a flow that considers an in-to-out protocol, consider the example of FIG. 3A where an end user is within a building and is conducting a call on his mobile device. This is illustrated by step 100. There is typically good wireless LAN coverage during a call in such an environment. Also, there is generally overlapping coverage between cellular network 12 and enterprise network 14.

If the end user begins to walk to his car, the signal may degrade at step 102. The mobile device may initiate a transfer of this call to another user such that a handoff can be executed at step 104. That user is actually the same end user of this phone, but the system does not distinguish between the two. Stated otherwise, the system is not aware of the fact that the transferee and the transferor are the same entity.

By using the BCT function, which is already configured on the mobile device, the mobile device can execute a handoff such that the call is handed to the public network (such as cellular network 12). This is illustrated by step 106. The BCT or the ECT function is normally done manually. For example, if a person is involved in the call, the end user can physically invoke this feature. In the present invention, the BCT and ECT functions are invoked autonomously by the mobile device.

These operations can be initiated and performed by handoff processing module 50, which is responsible for feature invocation and for determinations related to handoff scenarios. In other embodiments, any other suitable element is used to perform these operations. At step 108, the call is handed off in a seamless fashion such that the call continues with no (or minimal) disruption for the end user.

The scenario illustrated by FIG. 3B is not as critical as the one depicted by FIG. 3A because, without the scenario of FIG. 3A, calls may be lost or dropped. Notwithstanding, the scenario of FIG. 3B is significant, as it represents a handoff going from out-to-in (from a public network to an enterprise network).

In this scenario, an end user is already using the public network (e.g. cellular network 12) at step 200. At step 202, the end user elects to roam to a location that is proximate to a building, which has coverage provided to it by enterprise network 14. Note that the mobile device includes intelligence that constantly scans its environment for signal strength or for the presence of other networks.

As the end user enters the building at step 204, the mobile device elects to initiate the transfer function. In a GSM environment, the mobile device leverages the ECT function, which is inherent in this architecture, to perform the handoff. This is illustrated by step 206. Enterprise network 14 effectively picks up the call at step 208. Hence, an effective handoff has been executed via a generic transfer function, although only one end user was involved in the transfer.

For the scenarios of FIGS. 3A and 3B, only mobile station 28 needs an upgrade (e.g. software) to perform the outlined functions. In other embodiments, for example in a conferencing scenario, mobility application 26 may also require intelligence to accommodate the conferencing scenario. In the conferencing scenario, the primary call should be dropped, but not the second leg of the call.

Note that while the preceding examples include specific functional components for mobile station 28, mobile station 28 may include any collection and arrangement of components, including some or all of the enumerated functional components, for communicating with remote devices using cellular network 12 and/or enterprise network 14 and effecting a handoff between cellular network 12 and enterprise network 14. Moreover, mobile station 28 contemplates implementing each of the functional components using any suitable combination and arrangement of hardware and/or logic. Thus, in one embodiment mobile station 28 is a mobile phone. In other embodiments, mobile station 28 may be a personal digital assistant (PDA), any type of telephone, an electronic notebook, a laptop computer, or any other device operable to establish communications with cellular network 12 and enterprise network 14.

The preceding discussions illustrate particular methods for effecting handoffs between cellular network 12 and enterprise network 14. However, these discussions illustrate only exemplary methods of operation. While discussions often focus on particular transfer mechanisms (e.g. ECT and BCT), communication system 10 contemplates devices using any suitable techniques, elements, and applications for performing these handoff functions. Furthermore, many of the steps in the discussions may take place simultaneously and/or in different orders than as shown. In addition, the devices may use methods with additional steps or fewer steps, so long as the methods remain appropriate. Moreover, other devices of communication system 10 may perform similar techniques to support feature invocation and handoffs between cellular network 12 and enterprise network 14.

It is critical to note that the stages and steps in the FIGURES illustrate only some of the possible scenarios and operations that may be executed by, or within, the present system. Some of these stages and/or steps may be deleted or removed where appropriate, or these stages and/or steps may be modified, enhanced, or changed considerably without departing from the scope of the present invention. In addition, a number of these operations have been described as being executed concurrently with, or in parallel to, one or more additional operations. However, the timing of these operations may be altered. The preceding example flows have been offered for purposes of teaching and discussion. Substantial flexibility is provided by the tendered architecture in that any suitable arrangements, chronologies, configurations, and timing mechanisms may be provided without departing from the broad scope of the present invention. Accordingly, communications capabilities, data processing features and elements, suitable infrastructure, and any other appropriate software, hardware, or data storage objects may be included within communication system 10 to effectuate the tasks and operations of the elements and activities associated with executing handoffs.

Although the present invention has been described in detail with reference to particular embodiments, it should be understood that various other changes, substitutions, and alterations may be made hereto without departing from the spirit and scope of the present invention. The illustrated network architecture of FIG. 1 has only been offered for purposes of example and teaching. Suitable alternatives and substitutions are envisioned and contemplated by the present invention: such alternatives and substitutions being clearly within the broad scope of communication system 10. For example, the use of gateway 22 could be supplanted by bridges, switches, routers or any other suitable devices that are conducive to network communications.

Numerous other changes, substitutions, variations, alterations, and modifications may be ascertained to one skilled in the art and it is intended that the present invention encompass all such changes, substitutions, variations, alterations, and modifications as falling within the spirit and scope of the appended claims.

What is claimed is:

1. An apparatus for providing a handoff in a network environment, comprising:
 a mobile station configured to:
 detect signal degradation in an enterprise network;
 in response to detecting the signal degradation in the enterprise network, autonomously invoke a first generic call transfer function comprising a blind call transfer function configured on the mobile station to handoff the mobile station from the enterprise network to a cellular network independently of a mobility application of the enterprise network, the blind call transfer function configured to transfer a first call from a transferor user in the enterprise network to a transferee user in the cellular network;
 detect signal degradation in the cellular network;
 in response to detecting the signal degradation in the cellular network, autonomously invoke a second generic call transfer function comprising an explicated call transfer function configured on the mobile station to handoff the mobile station from the cellular network to the enterprise network independently of the mobility application of the enterprise network, the explicated transfer function configured to transfer a second call from a transferor user in the cellular network to a transferee user in the enterprise network;
 configure the first and second generic call transfer functions to hand off the mobile station by designating the mobile station as both the transferor user and the transferee user;
 communicate a first and second call ID to a mobility application to uniquely distinguish the second call from the first call; and
 leverage the first and second generic call transfer functions to execute the handoff for the mobile station, wherein the mobile station is operable to recognize that the transferred call is an inter-network roaming call and answer the call automatically.

2. The apparatus of claim 1, wherein the function is a selected one of a group of functions, the group consisting of:
 1) HOLD;
 2) resume;
 3) retrieve;
 4) call-waiting;
 5) conferencing;
 6) transfer;
 7) caller ID;
 8) redirect;
 9) three-way calling; and
 10) barging operations.

3. The apparatus of claim 1, wherein the handoff is executed as a result of a degradation in signal quality, or as a result of selecting a preferred network and disregarding the signal quality for the call.

4. The apparatus of claim 1, wherein the mobile station is configured to:
perform a scanning operation; and
hand off the call as a result of the scanning operation performed by the mobile station.

5. A method for providing a handoff in a network environment, comprising:
detecting signal degradation in an enterprise network;
in response to detecting the signal degradation in the enterprise network, autonomously invoking, by a mobile station, a first generic call transfer function comprising a blind call transfer function configured on the mobile station to handoff the mobile station from the enterprise network to a cellular network independently of a mobility application of the enterprise network, the blind call transfer function configured to transfer a first call from a transferor user in the enterprise network to a transferee user in the cellular network;
detecting signal degradation in the cellular network;
in response to detecting the signal degradation in the cellular network, autonomously invoking, by the mobile station, a second generic call transfer function comprising an explicated call transfer function on configured the mobile station to handoff the mobile station from the cellular network to the enterprise network independently of the mobility application of the enterprise network, the explicated transfer function configured to transfer a second call from a transferor user in the cellular network to a transferee user in the enterprise network;
configuring, by the mobile station, the first and second generic call transfer functions to hand off the mobile station by designating the mobile station as both the transferor user and the transferee user;
communicating with a mobility application to achieve the handoff;
communicating a first and second call ID to the mobility application to uniquely distinguish the second call from the first call; and
leveraging the first and second generic call transfer functions to execute the handoff for the mobile station, wherein the mobile station is operable to recognize that the transferred call is an inter-network roaming call and answer the call automatically.

6. The method of claim 5, wherein the function is invoked after the mobile station has roamed from an enterprise network to a cellular network.

7. The method of claim 5, wherein the function is invoked after the mobile station has roamed from a cellular network to an enterprise network.

8. The method of claim 5, wherein the generic transfer function is a selected one of a blind call transfer (BCT) function and an explicated call transfer (ECT) function.

9. The method of claim 5, wherein the handoff is executed as a result of a degradation in signal quality for the call.

10. The method of claim 5, further comprising:
handing off the call when the mobile station roams from a cellular network and back into an enterprise network.

11. A non-transitory computer readable medium comprising a computer program for providing a handoff in a network environment, the computer program comprising computer code
that when executed is operable to:
detect signal degradation in an enterprise network;
in response to detecting the signal degradation in the enterprise network, autonomously invoke, by a mobile station, a first generic call transfer function comprising a blind call transfer function configured on the mobile station to handoff the mobile station from an enterprise network to a cellular network independently of a mobility application of the enterprise network, the blind call transfer function configured to transfer a first call from a transferor user in the enterprise network to a transferee user in the cellular network;
detect signal degradation in the cellular network;
in response to detecting the signal degradation in the cellular network, autonomously invoke, by the mobile station, a second generic call transfer function comprising an explicated call transfer function configured on the mobile station to handoff the mobile station from the cellular network to the enterprise network independently of the mobility application of the enterprise network, the explicated transfer function configured to transfer a second call from a transferor user in the cellular network to a transferee user in the enterprise network;
configure, by the mobile station, the first and second generic call transfer functions to hand off the mobile station by designating the mobile station as both the transferor user and the transferee user;
communicate with a mobility application to achieve the handoff;
communicate a first and second call ID to the mobility application to uniquely distinguish the second call from the first call; and
leverage the first and second generic call transfer functions to execute the handoff for the mobile station, wherein the mobile station is operable to recognize that the transferred call is an inter-network roaming call and answer the call automatically.

12. The medium of claim 11, wherein the function is invoked after the mobile station has roamed from an enterprise network to a cellular network.

13. The medium of claim 11, wherein the function is invoked after the mobile station has roamed from a cellular network to an enterprise network.

14. The medium of claim 11, wherein the generic transfer function is a selected one of a blind call transfer (BCT) function and an explicated call transfer (ECT) function.

15. The medium of claim 11, wherein the handoff is executed as a result of a degradation in signal quality for the call.

16. The medium of claim 11, wherein the code is further operable to:
hand off the call when the mobile station roams from a cellular network and back into an enterprise network.

* * * * *